(12) United States Patent
Joo et al.

(10) Patent No.: US 7,450,859 B2
(45) Date of Patent: Nov. 11, 2008

(54) OPTICAL SUBSCRIBER NETWORK SYSTEM

(75) Inventors: Young-Hun Joo, Suwon-si (KR);
Chan-Yul Kim, Bucheon-si (KR);
Jun-Ho Koh, Suwon-si (KR);
Kyu-Hyung Cho, Bucheon-si (KR)

(73) Assignee: Samsung Electronics Co., Ltd.,
Maetan-Dong, Yeongtong-Gu, Suwon-Si,
Gyeonggi-Do (KR)

( * ) Notice: Subject to any disclaimer, the term of this patent is extended or adjusted under 35 U.S.C. 154(b) by 647 days.

(21) Appl. No.: 10/783,804

(22) Filed: Feb. 20, 2004

(65) Prior Publication Data

US 2005/0047790 A1 Mar. 3, 2005

(30) Foreign Application Priority Data

Aug. 26, 2003 (KR) .................. 10-2003-0059171

(51) Int. Cl.
*H04J 14/02* (2006.01)
(52) U.S. Cl. ....................... 398/168; 398/100
(58) Field of Classification Search ................. 398/168, 398/100
See application file for complete search history.

(56) References Cited

U.S. PATENT DOCUMENTS

| 5,311,344 | A  | * | 5/1994  | Bohn et al. ............... 398/72 |
| 7,146,104 | B2 | * | 12/2006 | Farmer .................... 398/72 |
| 2002/0118413 | A1 | * | 8/2002 | Yamada et al. ............ 359/118 |
| 2003/0128983 | A1 |   | 7/2003  | BuAbbud et al. |

FOREIGN PATENT DOCUMENTS

| EP | 0386482 | 9/1990 |
| JP | 2002-261789 | 9/2002 |
| JP | 2003-230124 | 8/2003 |

OTHER PUBLICATIONS

Ethernet: The Definitive Guide, chapters 9 & 10, by Charles E. Spurgeon; O'Reilly, Feb. 1, 2000. http://proquest.safaribooksonline.com/1565926609 ; ISPN 1565926609.*

"An Optimized ATM-PON Based FTTH Access Network;" Jong-Won Kim; International Conference on Information, Communications and Signal Processing (ICICS); Sep. 1997; XP010264117; 5 pgs.

* cited by examiner

*Primary Examiner*—Shi K. Li
*Assistant Examiner*—Danny W Leung
(74) *Attorney, Agent, or Firm*—Cha & Reiter, LLC

(57) ABSTRACT

An optical subscriber network system is disclosed, which comprises: a server bi-directional optical transmitter including a multiplexer to multiplexes communication data and broadcast data, a server laser diode to converts the multiplexed data into an optical signal, and a server photo diode receive communication data from a subscriber, wherein the server bi-directional optical transmitter transmits the upstream communication data; and a subscriber bi-directional optical receiver including a subscriber laser diode to transmit upstream communication data, a subscriber photo diode to receive the optical signal transmitted from the server bi-directional optical transmitter, and a demultiplexer to demultiplex and divide the multiplexed signal into communication data and broadcast data. In the optical subscriber network system, the optical transmitter and the optical receiver can transceive image signals and Ethernet communication signals in a two-way direction by means of a single laser diode and photo diode.

8 Claims, 5 Drawing Sheets

OPTICAL SUBSCRIBER NETWORK SYSTEM

CLAIM OF PRIORITY

This application claims priority to an application entitled "Optical subscriber network system," filed in the Korean Intellectual Property Office on Aug. 26, 2003 and assigned Serial No. 2003-59171, the contents of which are hereby incorporated by reference.

BACKGROUND OF THE INVENTION

1. Field of the Invention

The present invention relates to an optical subscriber network system, and more particularly, an optical subscriber network system that supports broadcast and communication services using a fiber to the home (FTTH) network.

2. Description of the Related Art

FIG. 1 is a block diagram of a conventional optical subscriber network. As shown in FIG. 1, an optical subscriber network system providing broadcast/communication service includes an optical line terminal (hereinafter, referred to as an OLT), an optical network unit (hereinafter, referred to as an ONU), and an optical cable. The OLT converts broadcast data transmitted from a broadcaster into an optical signal to provide a user with broadcast service. It then transmits one tied optical signal. The ONU is a user-side apparatus and transmits information, which is received from the OLT, to a subscriber. The optical cable connects the OLT to the ONU. Operationally, the ONU receives a service requirement from a terminal of a service user. The ONU then provides a corresponding service. The broadcast/communication data, which is transmitted from the broadcaster, is transmitted to the ONU via the OLT, In such an optical subscriber network system, when an optical signal is transmitted to a home, signals such as continuous Ethernet broadcast signals or video on demand (VOD) signals are transmitted to a subscriber in a single direction. A burst Ethernet communication signal is burst when it is transceived. Such directionality and continuity makes it difficult to transmit the two signals together. Therefore, broadcast signals in various channels are multiplexed by time division multiplexing (TDM). Then one optical wavelength is assigned to the multiplexed signal by a coarse wavelength division multiplexing (hereinafter, referred to as a CWDM). In this way, another optical wavelength is assigned to the Ethernet communication signal by the CWDM. By using such a CWDM method, a fiber to the home (FTTH) network is realized.

Shown in FIG. 2 is a conventional FTTH optical subscriber network system, in which a bi-directional transceiving of a digital broadcasting and an Internet signal is possible. Such a network includes a server-side bi-directional optical transmitter 110 (hereinafter, referred to as an OLT) and a subscriber-side bi-directional optical receiver 120 (hereinafter, referred to as an ONU). The OLT 110 includes a first laser diode (hereinafter, referred to as a LD) 111 for transmitting digital broadcast data, a second LD 112 for transmitting downstream Internet data, a server-side photo diode (hereinafter, referred to as a PD) 113 for receiving upstream Internet data, a band-pass filter 114 which is installed in front of the server-side PD 113 and passes only the upstream Internet data, and an multiple optical waveguide element 115 for dividing each input/output data. The ONU 120 includes an multiple optical waveguide element 125 for dividing data inputted from the server-side bi-directional optical transmitter 110, a first PD 121 for receiving the digital broadcast data inputted from the server-side bi-directional optical transmitter 110, a second PD 122 for receiving the downstream Internet data inputted from the server-side bi-directional optical transmitter 110, and a subscriber-side LD 123 for transmitting upstream Internet data.

The server-side PD 113 detects upstream Internet data 127 input from the subscriber-side. It enables a server computer to recognize the upstream Internet data 127. The first LD 111 is a vertical cavity surface emitting laser (hereinafter, referred to as a VCSEL). The VCSEL modulates input digital broadcast data 116 into an optical signal and transmits the modulated optical signal the ONU 120. The second LD 112 is a VCSEL having a wavelength different from the first LD 111. The second LD 112 modulates downstream Internet data 117 into an optical signal and transmits the modulated optical signal the ONU 120.

In addition, the subscriber-side LD modulates the upstream Internet data 127. This data is transmitted from the subscriber-side to the server-side. The subscriber-side LD modulates this data into an optical signal and outputs it. Further, the subscriber-side LD forms a pair with the second PD 122 in the subscriber-side and enables bi-directional transceiving of an Internet signal. The first PD 121 detects and outputs the digital broadcast data 116 modulated into an optical signal by the first LD 111. The second PD 122 detects the downstream Internet data 117 transmitted from the second LD 112 and converts it into data that can be recognized by a computer in the subscriber-side.

However, since such a conventional FTTH optical subscriber network system requires two optical signals (i.e. an optical signal for transmitting an image signal and an optical signal for transmitting an communication signal) the OLT 100 must transmit signals through the two LD 111 and 112. It also requires an optical coupler, which is an optical waveguide element, for coupling the signals. Accordingly, the system manufacturing cost increases. Further, even when the two signals are received in the ONU 200, the ONU 200 needs a coupler, which is an optical waveguide element, for dividing the two signals and the two PD 121 and 122. Thus, the number of parts and the system manufacturing cost are increased.

SUMMARY OF THE INVENTION

Accordingly, the present invention has been made to overcome or reduce the above-mentioned problems occurring in the prior art. One object of the present invention is to provide an optical subscriber network system, in which an optical transmitter and an optical receiver can respectively transceive an image signal and an Ethernet communication signal in a two-way direction using a single laser diode and photo diode.

According to the principles of the present invention an optical subscriber network system is provided, comprising a server bi-directional optical transmitter including a multiplexer to multiplexes communication data and broadcast data, a server laser diode to converts the multiplexed data into an optical signal, and a server photo diode receive communication data from a subscriber, wherein the server bi-directional optical transmitter transmits the upstream communication data; and a subscriber bi-directional optical receiver including a subscriber laser diode to transmit upstream communication data, a subscriber photo diode to receive the optical signal transmitted from the server bi-directional optical transmitter, and a demultiplexer to demultiplex and divide the multiplexed signal into communication data and broadcast data.

BRIEF DESCRIPTION OF THE DRAWINGS

The present invention will be more apparent from the following detailed description taken in conjunction with the accompanying drawings, in which.

DETAILED DESCRIPTION OF THE PREFERRED EMBODIMENT

Figure 1:
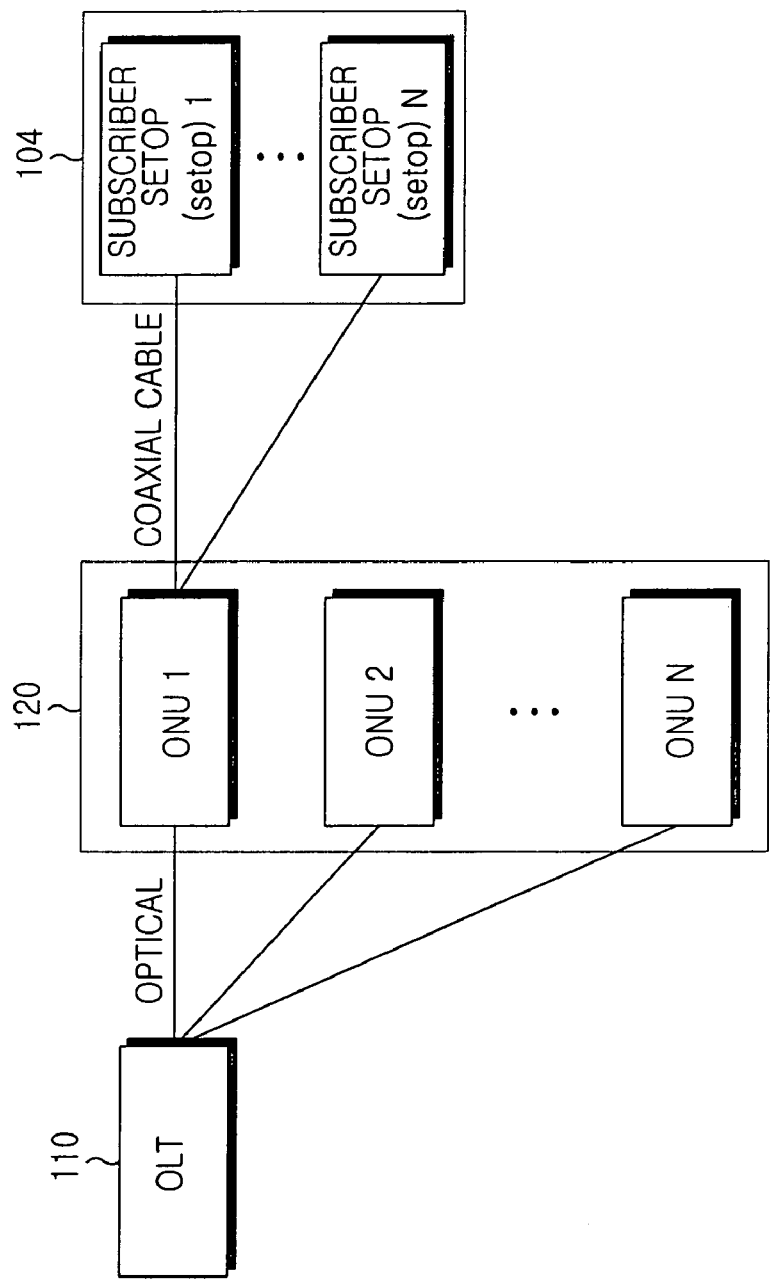
FIG. 1 is a block diagram of a conventional optical subscriber network.
Figure 2:
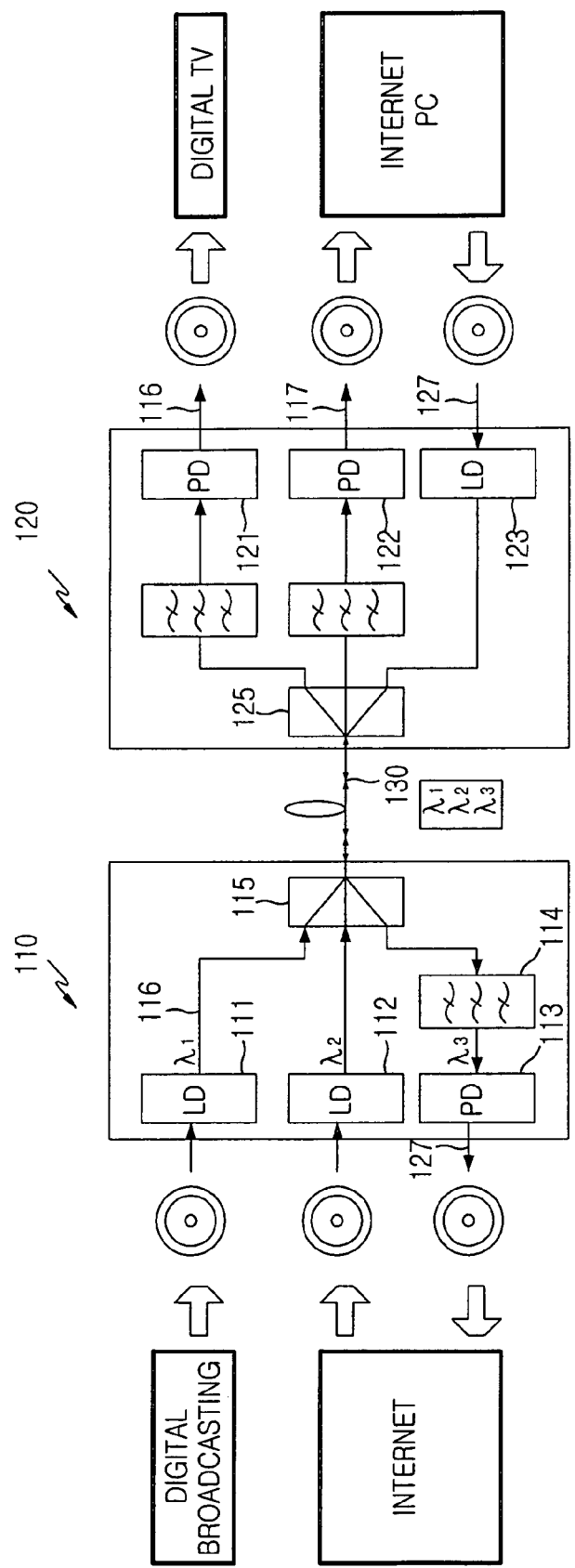
FIG. 2 is a block diagram of a conventional optical subscriber network system which supports a convergence service of broadcast and communication.

Hereinafter, a preferred embodiment according to the present invention will be described with reference to the accompanying drawings. The same reference numerals are used to designate the same elements as those shown in other drawings. In the below description, many particular items, such as detailed elements of circuit, are shown, but these are provided for helping the general understanding of the present invention, it will be understood by those skilled in the art that the present invention can be embodied without particular items. For the purposes of clarity and simplicity, a detailed description of known functions and configuration incorporated herein will be omitted as it may make the subject matter of the present invention unclear.

Figure 3:
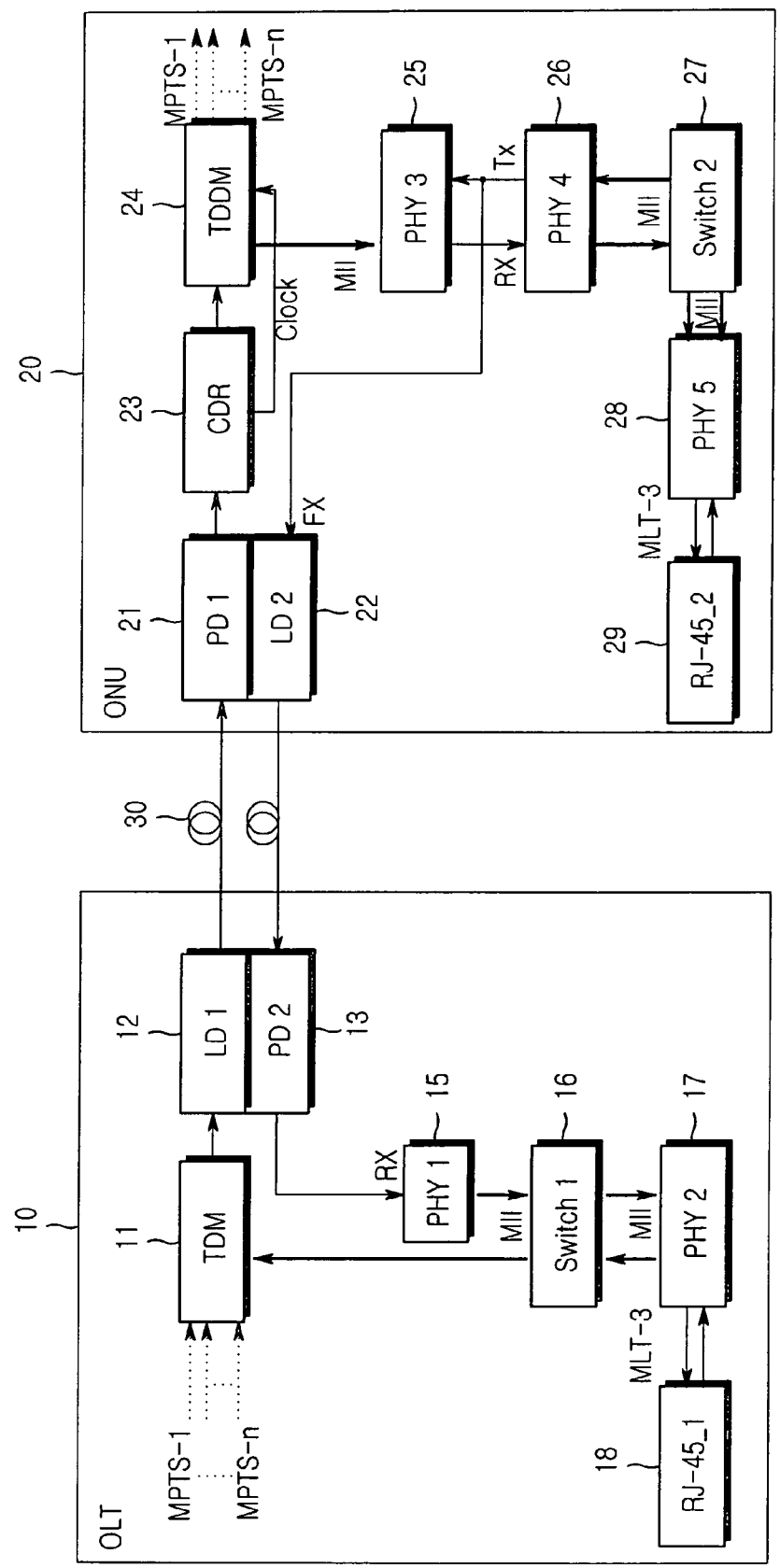
FIG. 3 is a block diagram of an optical subscriber network system which supports a convergence service of broadcast and communication according to an embodiment of the present invention.

FIG. 3 is a block diagram of an OLT 10 and an ONU 20 in an optical subscriber network system according to the present invention. The optical subscriber network system is realized in a FTTH network for providing a convergence service of broadcasting and communication. As shown in FIG. 3, the OLT 10 includes a RJ-45 connector 18 for connecting a server-side computer, an Ethernet switch 16, a time division multiplexer (hereinafter, referred to as a TDM) 11, a first laser diode (hereinafter, referred to as a LD) 12, and a second photo diode (hereinafter, referred to as a PD) 13. The Ethernet switch 16 is provided between a first PHY 15 and a second PHY 17. The TDM 11 combines an Ethernet communication signal and multi-channel MPEG2 multi program transport stream (hereinafter, referred to as a MPTS) signals. It then multiplexes the combined signal. The LD 12 converts the multiplexed signal into an optical signal and transmits the converted signal to the ONU 20 through an optical fiber 30. The PD 13 receives an Ethernet communication signal from the ONU 20 connected to a subscriber set-top box (not shown). The TDM 11 multiplexes the Ethernet communication signal and the MPTS signals. Moreover, it inserts the multiplexed signal into a time slot and constructs a time slot frame.

The ONU 20 includes a first PD 21, a second LD 22, a time division demultiplexer (hereinafter, referred to as a TDDM) 24, a clock and data recovery (hereinafter, referred to as a CDR) 23, a third PHY 25, a fourth PHY 26, an Ethernet switch 27, a fifth PHY 28, and a RJ-45 connector 29. The first PD 21 receives the multiplexed signal. The second LD 22 transmits an Ethernet communication signal provided from a subscriber-side computer. The TDDM 24 demultiplexes the multiplexed signal received by the first PD 21 and provides multi-channel broadcast signal to a subscriber set-top box. The CDR 23 provides the TDDM 24 with a clock signal and reproduces the multiplexed signal. The third PHY 25 converts a signal (a type of a communication signal) from the TDDM 24, e.g. from a media independent interface (hereinafter, referred to as a MII) signal, to a TX signal. The fourth PHY 26 converts a TX signal into a MII signal. The Ethernet switch 27 switches the MII signal from the fourth PHY 26 to provide the MII signal to a corresponding subscriber-side computer. The fifth PHY 28 converts the MII signal from the Ethernet switch 27 into a signal type which can be transmitted through a cable. The RJ-45 connector 29 connects a subscriber-side computer (not shown).

The first PHY 15 converts a RX signal generated by the second PD 13 into a MII signal. The second PHY 17 converts the MII signal into a multi level transmit-3 (hereinafter, referred to as a MLT-3) signal, which can be transmitted through an unshielded twisted pair (hereinafter, referred to as an UTP) cable. It then provides the MLT-3 signal to the RJ-45 connector 18. Further, the second PHY 17 converts a MLT-3 signal from the RJ-45 connector 18 into a MII signal and provides it to the Ethernet switch 16. The MII is an interface standard for 10 BaseT/100BaseTX media access control. The MII supports both a transmission rate of 2.5 Mhz for 10 BaseT transmission and a transmission rate of 25 Mhz for 100 BaseTX transmission. The MLT-3 is a method which lowers the frequency while maintaining a high-speed data communication speed. The Ethernet switch 27 performs the same function as a hub. It controls communication between a plurality of subscriber computers connected to the RJ-45 connector 29.

The fourth PHY 26 converts the MII signal from the Ethernet switch 27 into a TX signal and outputs it to the second LD 22. The TX signal output from the fourth PHY 26 is divided. Then the divided signal is input to an input terminal of the third PHY 25.

Hereinafter, operation of the OLT 10 and the ONU 20 will be described. First, a process course of an downstream Ethernet communication signal will be described. In the OLT 10, the Ethernet communication signal input through the RJ-45 connector 18 is converted into a MII signal via the second PHY 17 and the Ethernet switch 16. The MII signal is input to the TDM 11. Further, 'n' number of channels of the MPTSs, which are image signals, are input to the TDM 11. The 'n' number of channels of the MPTSs and the MII high-speed Ethernet communication signal are multiplexed by the TDM 11. The multiplexed signal is directly modulated by the first LD 12. Then, the modulated signals are input to the first PD 21 in the ONU 20 through an optical fiber 300.

Further, the signals are converted into electrical signals by the first PD 21 in the ONU 20. The converted signals are input to the CDR 23. Then, the signals are reproduced into electrical signals by the CDR 23. The reproduced signals are input to the TDDM 24. Herein, a clock is extracted from the CDR 23, and provided to the TDDM 24. The TDDM 24 divides the 'n' number of channels of the MPTSs and the high-speed Ethernet communication signal and then restores the signals.

Each MPTS signal is input to a broadcasting set-top box (not shown). Further, the MII Ethernet communication signal is input to the third PHY 25. Then it is converted into a non return to zero inversion (NRZI) signal which is an FX signal. Thereafter, the NRZI signal is input to the fourth PHY 26. For example, the FX signal is obtained by encoding an MII signal according to 100 Base-T standard, which is an electric signal, so that the signal can be transmitted through an optical fiber.

The MII signal output from the fourth PHY 26 is converted into a MLT-3 signal via the Ethernet switch 27 and the fifth PHY 28. Then the converted signal is output as an Ethernet communication signal through the RJ-45 connector 29.

Next, a process course of an upstream Ethernet communication signal is described. The Ethernet communication signal is input through the RJ-45 connector 29, which connects a subscriber computer, in the ONU 20. The input signal is converted into the NRZI signal, which is a FX signal, passing through the fifth PHY 28, the Ethernet switch 27, and the fourth PHY 26. The NRZI signal is directly modulated by the second LD 22. The third PHY 25 operates only when a signal is input to the third PHY 25. Thus, the FX signal, which is outputted to the second LD 22, must be divided. Then the divided signal must be also input to the third PHY 25.

The Ethernet communication signal is transmitted to the OLT 1 through the second LD 22 and an optical fiber. It is then received by the second PD 13 in the OLT 10. The received signal is transmitted to a server computer (not shown) through the RJ-45 connector 18 via the first PHY 15, the Ethernet switch 16, and the second PHY 17. The Ethernet switch 16 performs the same function as a hub. It switches Ethernet data according to predetermined switching information.

Figure 4:
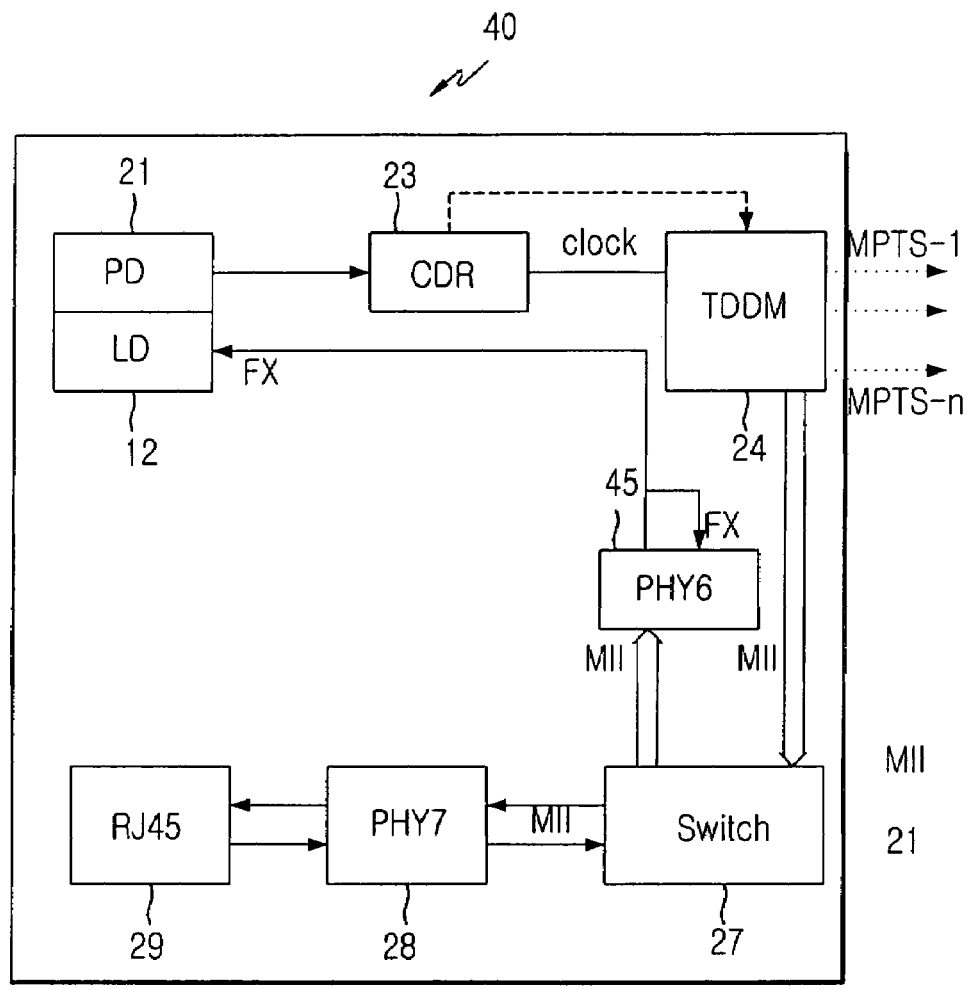
FIG. 4 is a block diagram of an optical subscriber network system which supports a convergence service of broadcast and communication according to another embodiment of the present invention.

FIG. 4 is a block diagram of an ONU 40 according to another embodiment of the present invention. As shown in FIG. 4, a TDDM 24 demultiplexes a signal, which is obtained by combining 'n' number of broadcast signals and a high-speed Ethernet communication signal, according to a clock of a CDR 23. Further, the TDDM 24 outputs MPTS signals of 'n' number of divided channels to set-top boxes (not shown). It also provides an Ethernet switch 27 with a MII signal, which is a high-speed Ethernet communication signal. The Ethernet switch 27 outputs a MII signal, which is a high-speed Ethernet signal input through a RJ-45 connector 29 and a seventh PHY 28, to a sixth PHY 45. The sixth PHY 45 converts the MII signal input from the Ethernet switch 27 into an FX signal and then outputs the FX signal to a second LD 22.

The sixth PHY 45 is operated only when a signal is input through an RX input pin. Thus, the input pin of the sixth PHY 45 to which a RX signal is input must be connected with an output pin of the sixth PHY 45 from which a TX signal is outputted.

Figure 5:
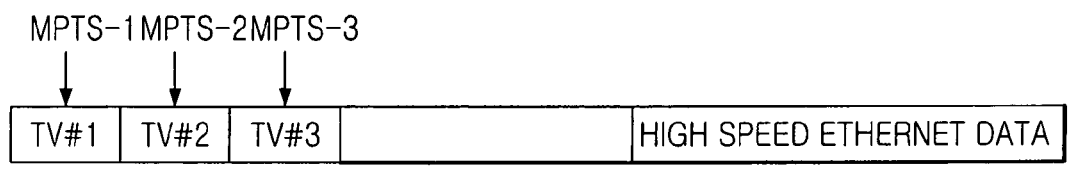
FIG. 5 is a view showing a frame generated by an optical subscriber network system according to the present invention.

FIG. 5 is a time slot frame 50 generated by multiplexing 'n' number of broadcasting signals and a high-speed Ethernet communication signal in a TDM according to the present invention. As shown in FIG. 5, the time slot frame 50 includes continuous time slots. FIG. 5 shows the time slot frame 50 including 'n' number of MPTS broadcasting signals and one high-speed Ethernet communication signal. Further, a TDM may be designed so that 'n' number of MPTS broadcast signals and a plurality of high-speed Ethernet communication signals is included in one time slot frame. Such a time slot frame is demultiplexed by the TDDM 24 in the ONU 20. The demultiplexed frame is divided into 'n' number of MPTS broadcast signals and one high-speed Ethernet communication signal.

Accordingly, in the present invention, the OLT 10 and the ONU 20 include a single LD and PD, respectively. The OLT 10 combines 'n' number of channels of MPTS broadcasting signals and a high-speed Ethernet signal input through a RJ-45 connector. It multiplexes them as a time slot signal, and transmits the multiplexed signal through the LD. Then, the ONU 20 receives the combined signal through a single optical receiver. It divides the received signal into 'n' number of channels of MPTS broadcasting signals and a high-speed Ethernet signal. The ONU 20 provides the high-speed Ethernet signal to the Ethernet switch. It also provides the 'n' number of channels of MPTS broadcasting signals to a set-top box (not shown) connected to the TDDM 24. Further, when the high-speed Ethernet communication signal is transmitted, the ONU 20 outputs this signal, which is input from a subscriber computer connected to a RJ-45 connector, through the LD. The OLT 10 receives the high-speed Ethernet communication signal through an optical receiver. The OLT 10 transmits this signal to a server computer connected to a RJ-45 connector.

As described above, the OLT and the ONU of an optical subscriber network system according to the present invention do not require two LDs or an optical receiver in transceiving a high-speed Ethernet communication signal and a MPTS broadcast signal. Therefore, the optical subscriber network system has a reduced number of elements.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An optical subscriber network system comprising:
   a server bi-directional optical transmitter including:
      a multiplexer for multiplexing communication data and broadcast data;
      a server laser diode for converting the multiplexed data into an optical signal for downstream transmission to a subscriber;
      a server photo diode for receiving and converting optical signals comprising communication data from a subscriber, wherein the server bi-directional optical transmitter transmits the upstream communication data;
      a first PHY device for converting the communication data received from the server photo diode into a media independent interface (MII) signal; and
      an Ethernet switch coupled to the first PHY device, the multiplexer and a second PHY device; and
   a subscriber bi-directional optical receiver including:
      a subscriber laser diode for transmitting upstream communication data,
      a subscriber photo diode for receiving and converting the optical signal transmitted from the server bi-directional optical transmitter into an electrical signal, and
      a demultiplexer for multiplexing and dividing the multiplexed signal into communication data and broadcast data;
   wherein the optical transmitter and optical receiver are configured for transceiving image signals and Ethernet communication signals in two directions by a single laser diode and photo diode; and
   wherein the multiplexer and demultiplexer comprise time division multiplexer (TDM) and demultiplexer (TDDM), respectively;
   an Ethernet switch configured to (1) switch communication data transmitted from a demultiplexer to a subscriber computer, and (2) receive the communication data transmitted from the subscriber computer;
      the first PHY device being coupled to the demultiplexer for converting the communication data with a media independent interface type (MII type) into a TX signal;

the second PHY device for converting the TX signal into a MII signal for the Ethernet switch, and to convert a MII signal from the Ethernet switch into a TX signal for to a subscriber laser diode; and a third PHY device for converting the MII signal into a multi level transmit-3 (MLT-3) signal wherein, the TX signal output from the second PHY device is used to operate the first PHY device.

2. The optical subscriber network system as claimed in claim 1, wherein the communication data is received from a server computer.

3. The optical subscriber network system as claimed in claim 1, wherein the server bi-directional optical transmitter transmits the upstream communication data to a server computer.

4. An optical subscriber network system comprising:

a server bi-directional optical, transmitter including:
- a multiplexer for multiplexing communication data and broadcast data:
- a server laser diode for converting the multiplexed data into an optical signal for downstream transmission to a subscriber;
- a server photo diode for receiving and converting optical signals comprising communication data from a subscriber, wherein the server bi-directional optical transmitter transmits the upstream communication data;
- a first PHY device for converting the communication data received from the server photo diode into a media independent interface (MII) signal; and
- an Ethernet switch coupled to the first PHY device, the multiplexer and a second PHY device; and a subscriber bi-directional optical receiver including:
- a subscriber laser diode for transmitting upstream communication data,
- a subscriber photo diode for receiving, and converting the optical signal transmitted from the server bi-directional optical transmitter into an electrical signal, and
- a demultiplexer for multiplexing and dividing the multiplexed signal into communication data and broadcast data;

wherein the optical transmitter and optical receiver are configured for transceiving image signals and Ethernet communication signals in two directions by a single laser diode and photo diode;

wherein the multiplexer and demultiplexer comprise a time division multiplexer (TDM) and demultiplexer (TDDM), respectively; and the subscriber bi-directional optical receiver providing the communication data divided by the TDDM to a subscriber-side computer; and wherein the subscriber bi-directional optical receiver further comprises:

an, Ethernet switch to (1) switch the communication data from the demultiplexer to a subscriber-side computer, and (2) receive the communication data from the subscriber computer; and a third PHY device coupled to the demultiplexer to convert the communication data with a MII type into a TX signal for the Ethernet switch, and convert a MII signal from the Ethernet switch into a TX signal for the subscriber laser diode, wherein, the TX signal from the Ethernet switch is used to operate the third PHY device.

5. The optical subscriber network system as claimed in claim 1, wherein the first PHY device converts a 100 Base-T optical fiber signal into a MII signal, and the second PHY device converts a media independent interface MII) signal into a multi level transmit-3 (MLT-3) signal.

6. The optical subscriber network system as claimed in claim 1, wherein the TDM inserts a plurality of broadcast data streams and communication data into time slots and generates time slot frames.

7. The optical subscriber network system as claimed in claim 1, wherein subscriber bi-directional optical receiver further comprising:

the third PHY device converts the media independent interface (MII) signal input from an Ethernet switch into a Fast Ethernet (FX) signal and outputs the FX signal to the subscriber laser diode.

8. The optical subscriber network system as claimed in claim 7, wherein the FX signal is a non-return-to-zero-inversion (NRZI) signal.

* * * * *